United States Patent [19]

Kennavane

[11] 3,932,842

[45] Jan. 13, 1976

[54] COMPUTER TERMINAL

[75] Inventor: John J. Kennavane, Seaford, N.Y.

[73] Assignee: Sanders Associates, Inc., South Nashua, N.H.

[22] Filed: Oct. 28, 1971

[21] Appl. No.: 193,420

[52] U.S. Cl. .............................. 340/172.5; 197/129

[51] Int. Cl.[2] ........................ B41J 15/18; G06F 3/10

[58] Field of Search .......... 340/172.5; 197/123, 129

[56] References Cited

UNITED STATES PATENTS

| | | | |
|---|---|---|---|
| 2,213,552 | 9/1940 | Scharr | 197/129 |
| 2,569,674 | 10/1951 | Jones | 197/123 |
| 3,403,225 | 9/1968 | Mislan et al. | 340/172 J X |
| 3,444,977 | 5/1969 | Kinney et al. | 197/129 |
| 3,623,012 | 11/1971 | Lowry et al. | 340/172.5 |
| 3,623,016 | 11/1971 | Winkler | 340/172.5 |

*Primary Examiner*—Gareth D. Shaw
*Assistant Examiner*—Paul R. Woods
*Attorney, Agent, or Firm*—Louis Etlinger; William L. Hunter

[57] ABSTRACT

A terminal device is disclosed which includes a typewriter and a keyboard in which the actuation of each key generates a signal in a first code which signal is temporarily stored. Also included is a code converter which translates the signal into a second code suitable for actuating the typewriter so as to print a character, corresponding to each actuated key, in a first location. Provision is also made for typewriting a message from a remote computer in a second location.

8 Claims, 8 Drawing Figures

INVENTOR
JOHN J. KENNEVANE
BY W. L. Hunter
ATTORNEY

INVENTOR
JOHN J. KENNEVANE
BY
ATTORNEY

INVENTOR
JOHN J. KENNEVANE
BY W. L. Hunter
ATTORNEY

COMPUTER TERMINAL

FIELD OF THE INVENTION

This invention relates generally to terminal devices for use with a computer and particularly to such devices in which data entered by means of a keyboard can be transmitted to the computer and in which data is received from the computer in the form of a hard copy automatically printed or typewritten at the terminal.

BACKGROUND OF THE INVENTION

Terminal devices employing keyboards for communication with a computer may take various forms. Perhaps the simplest is one in which the actuation of each key immediately transmits a signal to the computer and substantially simultaneously prints a representation thereof at local terminal. Other known terminals provide a memory device so that several characters can be entered and stored before being printed at the terminal and transmitted to the computer. Other terminal devices allow many characters to be stored and displayed locally for verification, after which the group is transmitted to the remote computer. The present invention relates to the latter kind of terminal.

In certain operations, it is desired to enter an inquiry on the keyboard, visually verify it, correct it if necessary, and transmit it to the computer together with a request that, provided that goods or services are available on suitable terms, a record of the transaction, such as a bill of sale or the like, be printed at the local terminal by the computer. The provision of such a terminal device would seem, at first glance, to be a simple matter but certain difficulties arise. If the actuation of each key is to both print the character and transmit a signal indicative thereof to the computer, it is frequently necessary that two types of signals, or codes, be generated, one suitable for transmission to the computer and one suitable for actuating the printing mechanism. Another problem is that it often becomes difficult to separate the areas in which the inquiry is displayed for verification and which the reply from the computer is printed.

It is a general object of the present invention to provide an improved terminal device.

Another object is to provide an improved terminal device including a keyboard in which an entry can be displayed for verification in a first predetermined location before transmission to the computer and in which the response from the computer is displayed in a second predetermined location.

SUMMARY OF THE INVENTION

Briefly stated, a terminal device incorporating the present invention includes an encoder actuated by a keyboard for generating first signals in a first code indicative of that character corresponding to the actuated key. A memory is provided for temporarily storing signals representing a group of characters. As each character is stored, it is automatically read out and passed through a code converter which generates a second signal in a second code which in turn is passed to a printing mechanism which prints the character at a first predetermined location for the purpose of verification. Means are provided for transmitting signals representing a group of characters from the memory to the computer, after they have been verified as above. The response from the computer, which is in the first code, is also passed through the code converter and sent to the printing mechanism which prints the response in a second predetermined location.

DESCRIPTION OF PREFERRED EMBODIMENT

For a clearer understanding of the invention, reference may be made to the following detailed description in the accompanying drawing in which.

Figure 4A:
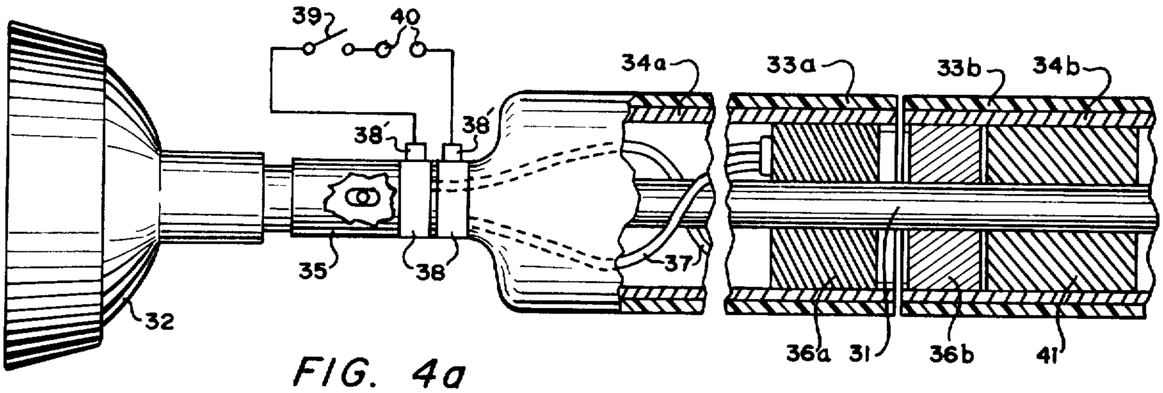
Figure 6:
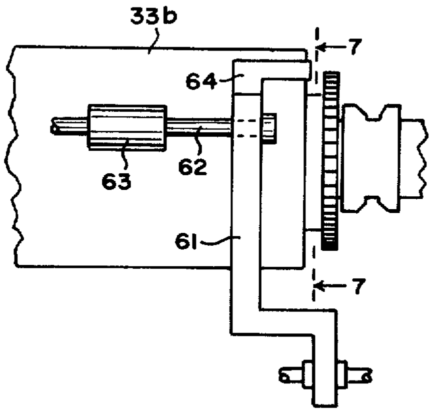
Figure 5:
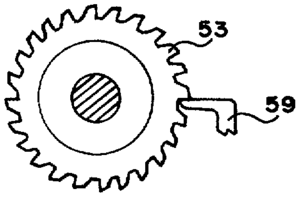
Figure 4B:
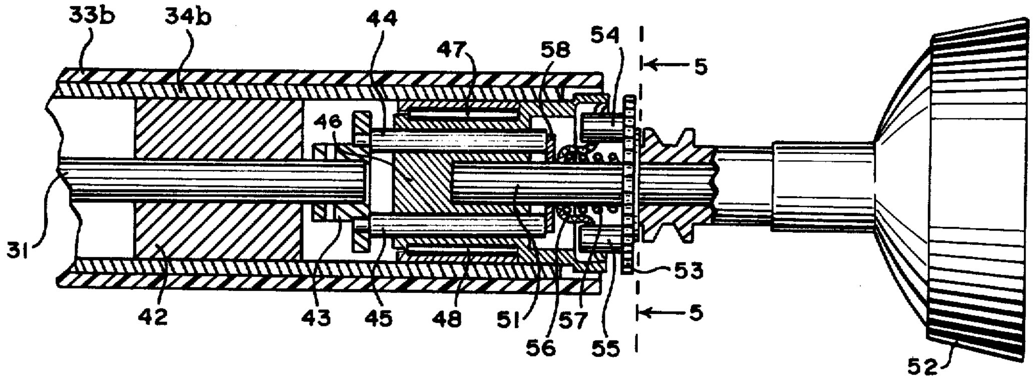

FIGS. 4*a* and 4*b* taken together constitute a view, partly in elevation and partly in section, of the split platen in the operator's console;

FIG. 5 is a fragmentary cross section view taken on the line 5—5 of FIG. 4*b*;

FIG. 6 is a fragmentary elevation view of a portion of the platen; and

Figure 7:
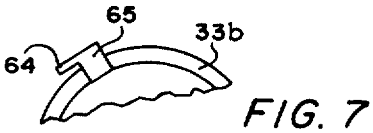

FIG. 7 is a fragmentary cross section taken on the line 7—7 of FIG. 6.

Figure 1:
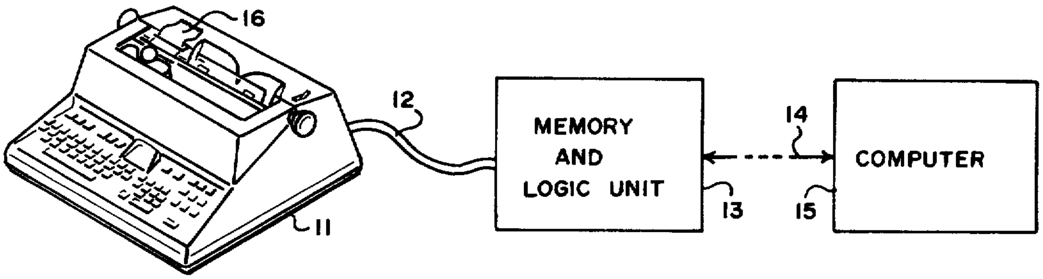
FIG. 1 is a diagram partly pictorial and partly in block form, showing a terminal device in accordance with the present invention and its connection to a computer.

Referring first to FIG. 1, there is shown an operator's console 11 which is used to enter data for transmission to the computer and which also receives information from the computer. The console 11 is connected by means of a cable 12 to a memory and logic unit 13 which in turn is connected by means of a suitable communication link 14, such as a radio channel or telephone line, to a remotely located computer 15.

The console 11 contains most of the parts of a standard electric typewriter plus a few additional components and modifications. For example, the console 11 preferably contains additional keys to enable it to communicate more readily with the computer. Also, the platen is split into two sections, one of which may be operated independently of the other. The section on the left is provided with a roll of paper 16, such as that used for adding machines, which is sometimes referred to as the scratch pad. The section on the right is preferably the larger of the two and is normally used to hold the paper upon which the computer types its messages. The two sections may be connected together by means of an electrically operated clutch, as will be more fully explained.

Figure 2:
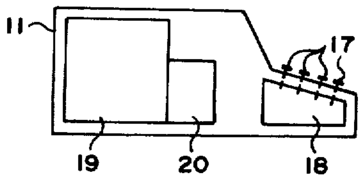
FIG. 2 is a schematic diagram showing certain components of the operator's console.

Referring now to FIG. 2, the operator's console 11 is shown schematically including a plurality of keys 17 which actuate an encoder 18. In response to the actuation of each key, the encoder 18 generates a unique signal indicative of the character or symbol corresponding to the actuated key. The console 11 also includes a printing mechanism 19 which performs the usual typewriter functions of printing, character spacing, line spacing, etc. The printing mechanism 19 includes a printing actuator 20 as a part thereof. In the typical electric typewriter, the actuator 20 responds to a code indicative of the various keys and actuates the mechanism 19 accordingly. If the console 11 were to be used solely as a typewriter, then the encoder 18 would generate directly the code required by the actuator 20. However, the code ordinarily used in electric typewriters leaves something to be desired for the purpose of transmitting information to a computer and accordingly, it is preferred that the encoder 18 generate the usual 7 bit ASCII code. This code is adequate for the purpose and, since it is widely used, increases the flexibility of the device. The keyboard including the keys 17 and the encoder 18 may be any of several well known kinds, one suitable example being a keyboard and encoder available commercially as a single unit, designated "Mark III", from Control Research Corporation, Garden Grove, California, 92641. The printing mechanism 19 including the actuator 20 may be those of a standard commercial electric typewriter, one suitable example being the IBM "Selectric" typewriter, such as that described in U.S. Pat. No. 2,879,876.

Figure 3:
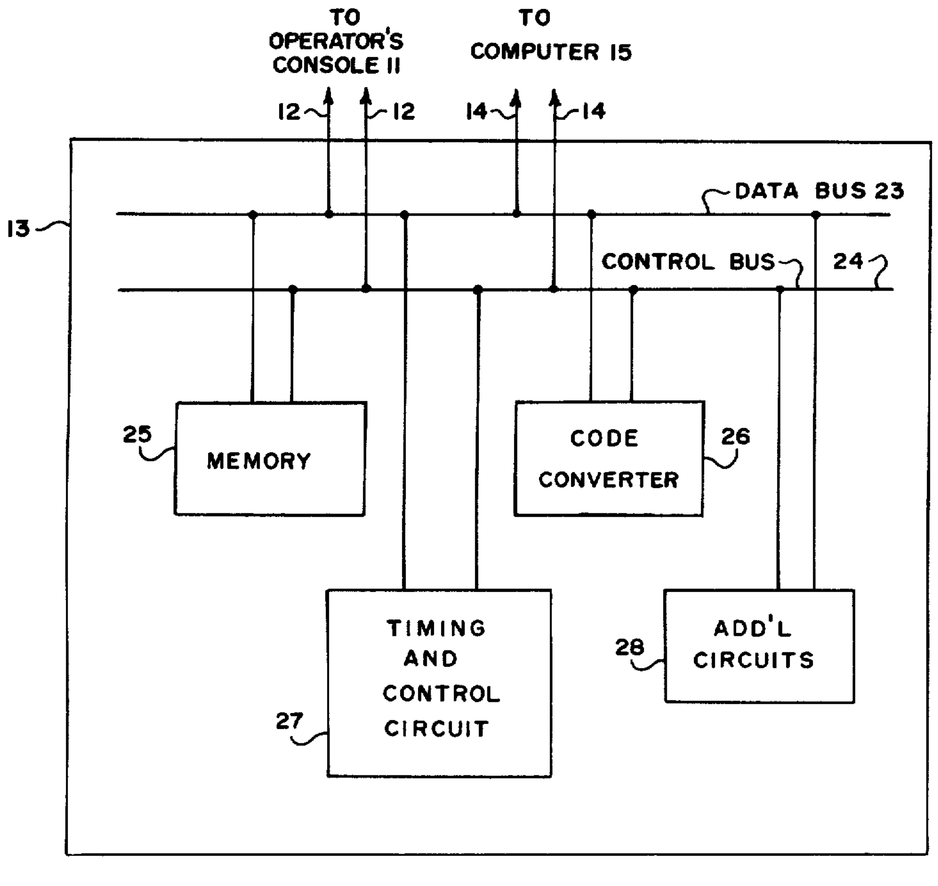
FIG. 3 is a block schematic diagram of the memory and logic unit of FIG. 1.

Referring now to FIG. 3 the memory and logic unit 13 is shown in schematic block form. The unit includes a data bus 23, a control bus 24, memory unit 25, a code converter 26, and a timing and control circuit 27. The unit 13 includes additional elements but since a discussion of them is not necessary to an understanding of the present invention and since they are all conventional, they have not been shown in detail but have been indicated generally as "additional circuits" by the reference character 28. Each of the units 25, 26, 27 and 28 is connected to both the data bus 23 and the control bus 24. It will be understood that both of these busses, as well as the schematically indicated connecting lines, may consist of many conductors each and that the lines shown merely represent symbolically the flow of signals. It will also be understood that each of the units 25, 26, 27 and 28 includes the various logic gates necessary for proper operation. The data bus 23 and the control bus 24 are also connected to both the operator's console 11 and to the computer 15 so that the operation of all of these units may be coordinated.

The memory unit 25 may be any of several well known types, for example, a series of flip flop circuits. The unit is of a kind which is capable of having additional information entered, of having information deleted, and having information read out without deletion. Such memories are well known to those skilled in the art and accordingly the details thereof have not been shown, although they may be similar to those described in the descriptive literature published by Intel Corporation, Santa Clara, California, as of July, 1971 describing the "Silicon Gate MOS LSI RAM 1103". The code converter 26 is a logic unit which accepts a code word as an input and in response thereto delivers a different code word as an output. Such a code converter may, for example, comprise a Read Only Memory but the details thereof have not been shown since they are well known to those skilled in the art and may be similar to those described in an article by John Linford entitled "ROM at the Top" appearing in "The Electronic Engineer" for May, 1969, beginning at page 64. The timing and control circuit 27 includes the clock generators, timing pulse generators and gate generators necessary to control and coordinate the operation of the various units all as well known to those skilled in the art.

The overall operation of the terminal may be described before considering the details of the platen. The operator enters data by means of the keys 17. As each key is actuated, it operates the encoder 18 to generate a signal, preferably in the ASCII code, indicative of the character corresponding to that key. This signal is sent over the cable 12 to the memory and logic unit 13. Under control of the timing and control circuit 27, the signal is sent to the memory 25 and stored. It is immediately read out and passed through the code converter 26 which, in response to the ASCII code, generates a second signal indicative of the same character in what is herein called the "typewriter" code. This "typewriter" code is sent back over the cable 12 to the console 11 and applied to the actuator 20 which causes the printing mechanism 19 to print the character on the left hand side of the platen on the "scratch pad" 16. All of these operations, although occurring successively under control of timing and enabling waveforms generated by the circuit 27, occur so rapidly that, to the eye of the operator, the character is printed immediately upon actuation of the key. The operator actuates successive keys, thereby storing and printing the message. It can be visually verified on the "scratch pad" after which the operator may depress a "send" key whereupon the entire message is read out of the memory 25 and sent over the communication link 14 to the computer. Messages from the computer are sent in the ASCII code over the link 14 to the unit 13 where they are passed through the code converter 26 and then sent to the console 11. This message, which is now in the "typewriter" code is passed to the actuator 20 which controls the print mechanism 19 so as to print the message on the right hand side of the console 11.

Referring now to FIGS. 4*a* and 4*b*, the platen is principally of conventional construction, being modified only as necessary for the purposes of the present invention. It includes a main shaft 31 which extends throughout most of the length of the platen. At its left end, it is fastened to a knob 32 by which the operator can rotate the shaft. The platen itself includes a cylindrical shell 33 of resinous material fastened to an inner metallic cylindrical shell 34. As shown in FIG. 4*a*, these two shells are split into two sections, the left hand sections being designated 33*a* and 34*a* respectively and the right hand sections being designated 33*b* and 34*b* respectively. The portions 33*a* and 34*a* *are fastened together and to a hub 35 which in turn is fastened to the shaft 31 by a pin and slot arrangement so as to permit limited axial movement of the shaft 31 relative to the hub 35 while constraining the hub and shaft to rotate as a unit.*

The two portions of the platen may be selectively joined together by means of an electrically operated clutch 36. The left portion of the clutch, designated 36*a*, is securely fastened to the interior of the cylindrical shell 34*a* by any suitable means, such as an adhesive. The right hand portion of the clutch, designated 36*b*, is similarly fastened to the interior of the shell 34*b*. Both portions make a sliding fit with the shaft 31. A pair of lead wires 37 connect the clutch portion 36a to a pair of slip rings 38 mounted on the hub 35. The slip rings 38 are engaged by a pair of brushes 38' which are connected, through a switch 39, to a source of power shown schematically as comprising a pair of terminals 40. The switch 39 is preferably an electronic switch so that it can be actuated readily by the computer and/or by a key on the operator's console 11. The clutch 36 is normally disengaged so that the sections 33*a* of the platen can be rotated without rotating the section 33*b*. Closure of the switch 39 energizes the clutch to join these sections of the platen together.

The platen shells 33*b* and 34*b* are rotatably supported on the shaft 31 by means of bushings 41 and 42. Each of these bushings is securely fastened to the inner surface of the metal shell 34*b* and each makes a sliding fit with the shaft 31. The shaft 31 terminates short of the end of the shells 33*b* and 34*b*. A coupling 43 is fastened to the end of shaft 31 and in turn has fastened thereto a pair of pins 44 and 45 parallel to the axis of the shaft 31 but on diametrically opposite sides thereof.

These pins make a sliding fit in two bores of a member 46 which acts as the inner race of a roller bearing two of the rollers of which are shown at 47 and 48. A stub shaft 51 is fastened to the member 46 coaxial with the shaft 31 and extends to the right beyond the ends of the platen shells 33*b* and 34*b*. A knob 52 is fastened at the end of the shaft 51 and a ratchet wheel 53 is fastened to the shaft at a point just beyond the end of the platen shell 33*b*. Two pins 54 and 55 are fastened to the wheel 53 on opposite sides of the shaft 51 and extend inwardly. A generally cup shaped member 56 has a central aperture through which the shaft 51 extends and also is formed with a relatively wide flange. This flange contains two apertures which make a sliding fit with the pins 54 and 55. The outer edge of the rim of the member 56 is formed with serrations which engage corresponding serrations on the inner cylindrical surface of the member 46. A spring 57 surrounding the shaft 51 urges the member 56 away from the ratchet wheel 53. A washer 58 separates the base of the member 53 from the ends of the pins 44 and 45. The ratchet wheel 53 and a pawl 59, shown in FIG. 5, form a part of the usual ratchet mechanism by which the platen is rotated by predetermined amounts to constitute one, or two, or three line spaces. The remainder of the mechanism has not been shown since it is in all respects conventional. During normal operation, the wheel 53 is rotated an amount corresponding to, say, one line space and drives through the pins 54 and 55, the cup shaped member 56, the serrations, the member 46, the pins 44 and 45, and the coupling 43 so as to rotate the main shaft 31. The main shaft in turn rotates the left section of the platen 33a and will also rotate the right hand section 33*b* but only provided the clutch 36 is energized. When the knob 32 (FIG. 4*a*) is pushed to the right, the shaft 31 will also be moved to the right and push ahead of it the coupling 43, the pins 44 and 45, the washer 58 and the member 56 sufficiently so that the serrations on the members 46 and 56 become disengaged. This permits the platen to be rotated in increments different from a multiple of one line space. This operation, and, in fact, the mechanism by which it is accomplished, is well known and is not a part of the present invention except insofar as the inclusion of the roller bearing allows all this mechanism to operate without affecting the platen section 33b unless the clutch 36 is engaged.

Referring now to FIG. 6, there is shown the right end of the platen 33*b* and a bracket 61 which supports a rod 62 which in turn carries the usual rollers 63 which hold the paper against the platen. Fastened to the end of the bracket 61 is an auxiliary bracket 64 which, as best shown in FIG. 7, is formed with a bent over portion 65 which bears lightly against the outer edge of the platen section 33*b*. The purpose of this bracket is to prevent the platen 33*b* from drifting out of position inadvertently when the clutch 36 is not engaged. The friction is adequate for this purpose but not sufficient to interfere with normal operation when the clutch is engaged.

In operation, when the console 11 is to be used to interrogate the computer, the paper upon which the message is to be written may be inserted into the console on the right hand side. The clutch 36 is normally disengaged and the operator enters the data and inquiries by actuating the keys 17. Each character is transmitted in the ASCII code to the logic unit where it is stored, read out, and transmitted back to the actuator 20 and print mechanism 19 so as to print the inquiry on the "scratch pad" 16. Upon verification, the operator depresses a "send" key which sends the inquiry to the computer. When the computer replies, it sends coded messages which in passing through the memory and logic unit 13 are converted from the ASCII code to the "typewriter" code and applied to the actuator 20 and print mechanism 19. One of the signals will cause the closure of switch 39 and the energization of the clutch 36. The message will normally be printed on the paper inserted on the right hand side of the platen 33, although, if desired, it would be possible to use the entire platen for this message.

From the foregoing it will be apparent that Applicant has provided a novel terminal device which utilizes a first optimum code for data transmission to and from a computer and a second optimum code for actuation of a printing mechanism. Additionally, the present invention permits the ready separation of the display of characters for verification and the written reply from a remote location. Only those portions of the apparatus necessary for an understanding of the present invention have been shown in detail. It will be understood that a complete, commercially satisfactory system requires many components which either are not shown herein at all or are shown only schematically or in block form. For example, the timing and control circuit preferably includes circuitry to prevent attempted actuation of the printing mechanism simultaneously by both the keyboard and the computer. Similarly, although pertinent portions of preferred embodiment has been described in considerable detail for illustrative purposes, many modifications can be made within the spirit of the invention. For example, the platen may be split in any desired proportions and either the right or left side may be the "scratch pad". Many other modifications will occur to those skilled in the art. It is therefore desired that the protection afforded by Letters Patent be limited only by the true scope of the appended claims.

What is claimed is:

1. A terminal device for communicating with a computer, comprising

- a first generally cylindrical platen section,
- a second generally cylindrical platen section,
- a keyboard having a plurality of keys corresponding to various characters,
- means responsive to the actuation of said keys for generating a first series of signals in a first code indicative of the corresponding characters,
- a memory for storing said first series of signals,
- a code converter for receiving said first series of signals from said memory and for generating therefrom a second series of signals in a second code also indicative of said corresponding characters,
- means responsive to said second series of signals for printing said characters on paper held against said first platen section,
- a communication link,
- means including said code converter for receiving signals over said communication link in said first code and for generating therefrom a third series of signals in said second code, and
- means responsive to said third series of signals for printing characters indicative thereof on paper held against said second platen section.

2. A terminal device in accordance with claim 1 in which said first and second platen sections are mounted coaxially and adjacent to each other, and which includes selectively actuable means for alternatively joining said sections for unitary rotation or for detaching said sections for independent rotation.

3. A terminal device in accordance with claim 2 including a shaft, means for mounting said first platen section for rotation with said shaft and means for mounting said second platen section for rotation about said shaft.

4. A terminal device for communicating with a computer, comprising, a keyboard including a plurality of keys corresponding to various characters, means responsive to the actuation of said keys for generating first signals in a first code indicative of the corresponding characters, a memory for storing said first signals, a code converter for receiving said first signals from said memory and for generating therefrom second signals in a second code also indicative of said corresponding characters, and means responsive to said second signals for printing said characters.

5. A terminal device in accordance with claim 4 including a communication link and means for transmitting the contents of said memory over said communication link.

6. A terminal device in accordance with claim 4 including a communication link, means for converting signals received over said communication link in a first code into a second code, and means responsive to said signals as converted for printing the information content thereof.

7. A terminal device for communicating with a computer, comprising, a first generally cylindrical platen section, a second generally cylindrical platen section adjacent to and coaxial with said first section, a shaft extending along the axis of both sections, means for mounting said first section for rotation with said shaft and with limited axial movement with respect thereto, means for mounting said second section for rotation about said shaft and means for selectively connecting said first and second sections for unitary rotation.

8. A terminal device in accordance with claim 7 in which said means for mounting said second section includes first and second bushings fastened to the inner surface of said second section and freely rotatable about said shaft, and which includes a ratchet wheel, means mounted principally within the interior of said second section for selectively connecting said ratchet wheel to said shaft, and a roller bearing mounted between said last named means and said second platen section for allowing relative rotation therebetween.

* * * * *